(12) United States Patent
Lan

(10) Patent No.: US 12,474,747 B2
(45) Date of Patent: Nov. 18, 2025

(54) REWORKABLE FIXING ELEMENT

(71) Applicant: ASIA VITAL COMPONENTS CO., LTD., New Taipei (TW)

(72) Inventor: Wen-Ji Lan, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 332 days.

(21) Appl. No.: 18/202,956

(22) Filed: May 29, 2023

(65) Prior Publication Data
US 2024/0402767 A1    Dec. 5, 2024

(51) Int. Cl.
*F16B 41/00* (2006.01)
*G06F 1/18* (2006.01)
*G06F 1/20* (2006.01)
*H01L 23/40* (2006.01)

(52) U.S. Cl.
CPC ............ *G06F 1/183* (2013.01); *F16B 41/002* (2013.01); *G06F 1/20* (2013.01); *H01L 23/4006* (2013.01); *F16F 2226/04* (2013.01)

(58) Field of Classification Search
CPC .... F16B 41/002; F16B 21/186; F16F 2226/04
USPC .......................................... 411/999, 352, 353
See application file for complete search history.

(56) References Cited

U.S. PATENT DOCUMENTS

| | | | | |
|---|---|---|---|---|
| 2,831,520 A | * | 4/1958 | Clarke | F16B 5/0208 292/251 |
| 3,415,302 A | * | 12/1968 | Beck | F16B 37/044 411/350 |
| 5,836,429 A | * | 11/1998 | McGuire | F16D 65/091 188/78 |
| 6,468,011 B2 | * | 10/2002 | Mayer | F16B 21/18 411/153 |

(Continued)

FOREIGN PATENT DOCUMENTS

| CN | 1647599 A | 7/2005 |
|---|---|---|
| CN | 101039564 A | 9/2007 |

(Continued)

OTHER PUBLICATIONS

Search Report dated Mar. 4, 2024 issued by Taiwan Intellectual Property Office for counterpart application No. 112117158.

(Continued)

*Primary Examiner* — Flemming Saether
(74) *Attorney, Agent, or Firm* — Bradley J. Thorson; DeWitt LLP

(57) ABSTRACT

A reworkable fixing element includes a screw having a spring fitted thereon, a screw head with two opposite cuts, and a retaining ring for stopping the screw from axially moving down any further; a sleeve disposed outside the screw and the spring, and including two opposite windows near an upper end thereof and a coupling zone located below the windows; a spring retaining ring fitted around the coupling zone and including two upward hooked arms (Continued)

extended through the windows to press the spring to a compressed state. The used fixing element has an elastically released spring but is reworkable using a reworking tool, which pushes the spring into the sleeve via the two cuts. Then, the hooked arms are allowed to extend through the windows to press on and hold the spring in the compressed state again, and the fixing element is ready for use a second time.

7 Claims, 7 Drawing Sheets

(56) References Cited

U.S. PATENT DOCUMENTS

| | | | | |
|---|---|---|---|---|
| 6,955,512 | B2* | 10/2005 | Allen | H05K 7/14 |
| | | | | 211/26 |
| 7,474,532 | B1* | 1/2009 | Desrosiers | H01L 23/4006 |
| | | | | 165/185 |
| 8,511,956 | B2* | 8/2013 | Liu | H01L 23/4006 |
| | | | | 411/107 |
| 2003/0026674 | A1* | 2/2003 | Hegde | H01L 23/4093 |
| | | | | 411/353 |
| 2006/0279931 | A1 | 12/2006 | Lee | |
| 2008/0050196 | A1 | 2/2008 | Cao et al. | |
| 2008/0239678 | A1 | 10/2008 | Ploeg et al. | |
| 2012/0195711 | A1 | 8/2012 | Chiu | |
| 2024/0401633 | A1* | 12/2024 | Lan | F16B 41/002 |
| 2024/0402766 | A1* | 12/2024 | Lan | G06F 1/183 |
| 2024/0402769 | A1* | 12/2024 | Lan | G06F 1/183 |

FOREIGN PATENT DOCUMENTS

| | | |
|---|---|---|
| CN | 201845760 U | 5/2011 |
| CN | 104421260 A | 3/2015 |
| CN | 104428589 A | 3/2015 |
| CN | 207864383 U | 9/2018 |
| CN | 211017061 U | 7/2020 |
| CN | 211951083 U | 11/2020 |
| CN | 114885590 A | 8/2022 |
| CN | 116721984 A | 9/2023 |
| CN | 220354239 U | 1/2024 |
| JP | 2000022059 A | 1/2000 |
| TW | M643913 | 7/2023 |
| TW | 1861864 B | 11/2024 |
| WO | 03034467 A2 | 4/2003 |

OTHER PUBLICATIONS

Search Report dated May 22, 2025 issued by China National Intellectual Property Administration for counterpart application No. 202310515754X, 4 pages.

* cited by examiner

REWORKABLE FIXING ELEMENT

FIELD OF THE INVENTION

The present invention relates to a fixing element capable of applying an even downward force for connecting a heat dissipation device to a bare die heat source without causing damage to the bare die or forming thermal resistance between the heat dissipation device and the heat source; and more particularly, to a fixing element that is usable with a reworking tool to be reworked for use a second time,

BACKGROUND OF THE INVENTION

Nowadays, high performance and high power chips are used in electronic devices for the latter to provide highly enhanced computing power. The chip in processing data will produce a relatively high amount of heat to form a heat source. Conventionally, the chip is packaged or encapsulated to avoid the chip from being damaged. With the enhanced computing power thereof, the chip in processing data produces even more heat than ever before. However, the package of the chip adversely affects the produced heat from efficiently dissipating into outer environment. Therefore, many currently available chips are provided in the form of bare dies without any package to protect their surfaces. The non-packaged bare die has a non-smooth and convex surface and accordingly, has a relatively small and weak contact area between it and a heat dissipation device for heat exchange. Thus, the bare die is subjected to damage and breaking when the heat dissipation device is connected thereto.

Since the bare die as a heat source is not suitable for being directly connected to the heat dissipation device, the heat dissipation device is usually connected to a base, such as a motherboard or a circuit board, which has the bare die mounted thereon. In this case, internally threaded copper sleeve rods are provided on the base at four corners outside the heat source to serve as screw fastening points. Conventionally, to fix the heat dissipation device to the base carrying the heat source, screws are sequentially tightened to the screw fastening points one by one. Since the screws are not tightened synchronously, the heat dissipation device connected to the base tends to be skewed relative to the heat source to apply uneven forces to the heat source, and the bare die subjected to unevenly distributed force is easily broken and damaged.

Please refer to FIGS. 1 and 2, which show a conventional manner of fixing a heat dissipation device C to a heat source A in the form of a bare die. As shown, the bare die A is placed on a base D. Four corners of the base D correspondingly located outside the heat source A are provided with an internally threaded copper sleeve rod B each. The heat dissipation device C also has four holes C3 formed corresponding to the four copper sleeve rods B for a screw unit C1 to extend through each of the holes C3. Each of the screw units C1 has a spring C2 fitted therearound. To lay the heat dissipation device C to the top of the heat source A, the screw units C1 are sequentially threaded through the holes C3 into corresponding copper sleeve rods B one by one with a power screwdriver handled manually or by a mechanical arm. To shorten the fixing time on a production line and complete the fixing operation within a limited time period, each of the screw units C1 is fully tightened in one movement at a very quick speed. As soon as the screw unit C1 is fully tightened, the spring C2 fitted therearound is also compressed in a direction toward the heat source A. The screw units C1 individually tightened at a quick speed and the springs C2 quickly compressed toward the heat source A tend to result in uneven and asynchronous distribution of downward forces over four corners of the base D and accordingly the heat source A. And, the heat source A, i.e. the bare die, being fragile and breakable, is easily damaged under uneven force application thereto.

The bare die is so fragile that even downward forces must be synchronously applied by the heat dissipation device to the four corners of the base carrying the bare die to ensure successful fixing of the heat dissipation device to the top of the bare die. In the event the four corners of the base are subjected to unevenly and asynchronously applied forces from the heat dissipation device, warp of the bare die or the heat dissipation device might occur to cause incomplete contact and thermal resistance between the two parts. In some worse conditions, the warped bare die might become damaged and non-usable and the thermal resistance might lead to uneven heat distribution over or inactive heat conduction of the heat dissipation device.

There are also manufacturers who use spring loaded screws to connect the heat dissipation device to the bare die heat source, so as to solve the problem of not able to synchronously apply even downward forces to the heat dissipation device. The spring loaded screw is different from those in the prior art in that it includes a screw sleeve externally disposed around a screw main body and a spring fitted on the main body, and a spring stopper for temporarily compressing the spring in the screw sleeve. As soon as the spring stopper is disabled using a machine or a hand tool, the spring compressed in the screw sleeve is released to provide at two ends an upward and a downward elastically restoring force synchronously for evenly pressing the heat dissipation device against the heat source. In this case, while the spring loaded screw advantageously uses the spring to provide elastic spring force for adjusting or assisting the downward force applied by the screw to the heat dissipation device, the spring stopper for compressing the spring in the screw sleeve can only be used once. When the spring stopper is disabled to release the compressed spring, the released spring can not be compressed again in the screw sleeve. The old spring loaded screw with the released spring must be dismounted from the heat dissipation device and be replaces with a new one for tightening to the heat dissipation device.

It is therefore tried by the inventor to find a fixing element that enables the heat dissipation device to apply even and synchronous forces to the heat source to ensure full and close contact between them, maintains a proper binding force between the bare die and the heat dissipation device, and is repeatedly adjustable for reuse.

SUMMARY OF THE INVENTION

To effectively solve the above problems, it is a primary object of the present invention to provide a reworkable fixing element, a plurality of which can be tightened synchronously to provide even downward forces, so as to avoid broken or collapsed edges of a bare die computing chip as would occur in the prior art where a plurality of conventional fixing screws is pre-tightened to a heat dissipation device one by one.

Another object of the present invention is to provide a reworkable fixing element, which is usable with a reworking tool, so that a released spring of the fixing element can be compressed again and the fixing element can be reused for mounting.

To achieve the above and other objects, the reworkable fixing element according to the present invention includes a screw, a sleeve, and a spring retaining ring.

The screw has a spring externally fitted therearound, and includes a screw head and a plurality of male threads formed at an upper and a lower end of the screw, respectively; two cuts formed at two diametrically opposite positions on the screw head to axially cut through the screw head; and a retaining groove formed closely above the male threads for receiving a retaining ring therein. The spring having a top and a bottom end, and the bottom end of the spring is pressed against the retaining ring.

The sleeve has an open upper end, and open lower end, and a receiving space defined in the sleeve between the upper and the lower end; the sleeve includes a pair of windows correspondingly formed near the upper end at two diametrically opposite positions and radially communicable with the receiving space, and a coupling zone located on an outer surface of the sleeve. The sleeve is disposed outside the screw and the spring.

The spring retaining ring is fitted on around the coupling zone of the sleeve, and includes a hooked arm set upward extended from an upper side of the spring retaining ring. The hooked arm set includes a pair of hooked arms for extending through the windows into the receiving space in the sleeve to press against a top end of the spring and hold the spring in a compressed state. When a heat dissipation device is to be connected to a bare die heat source using the fixing elements of the present invention, a pressing tool may be used to apply a downward pressure to the spring retaining ring, and the hooked arms are brought to move downward at the same time to thereby separate from the top end of the spring, allowing the spring to release an elastic restoring force and apply a downward force to the heat dissipation device.

When the fixing element has been used to connect the heat dissipation device to the heat source, the spring thereof is in an elastically released state. However, the fixing element is reworkable for use again. To rework the fixing element, the spring thereof must be compressed again to return to its original position. For this purpose, a reworking tool including at least two pressing columns is used. The two pressing columns of the reworking tool are correspondingly extended into the two cuts on the screw head to directly push the spring downward into the receiving space again. At this point, the hooked arms of the spring retaining ring are allowed to extend through the windows into the receiving space to abut on the top end of the spring and hold the latter in the compressed state, and the fixing element is now reworked and can be used a second time to connect the heat dissipation device to the heat source.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof.

Figure 1:
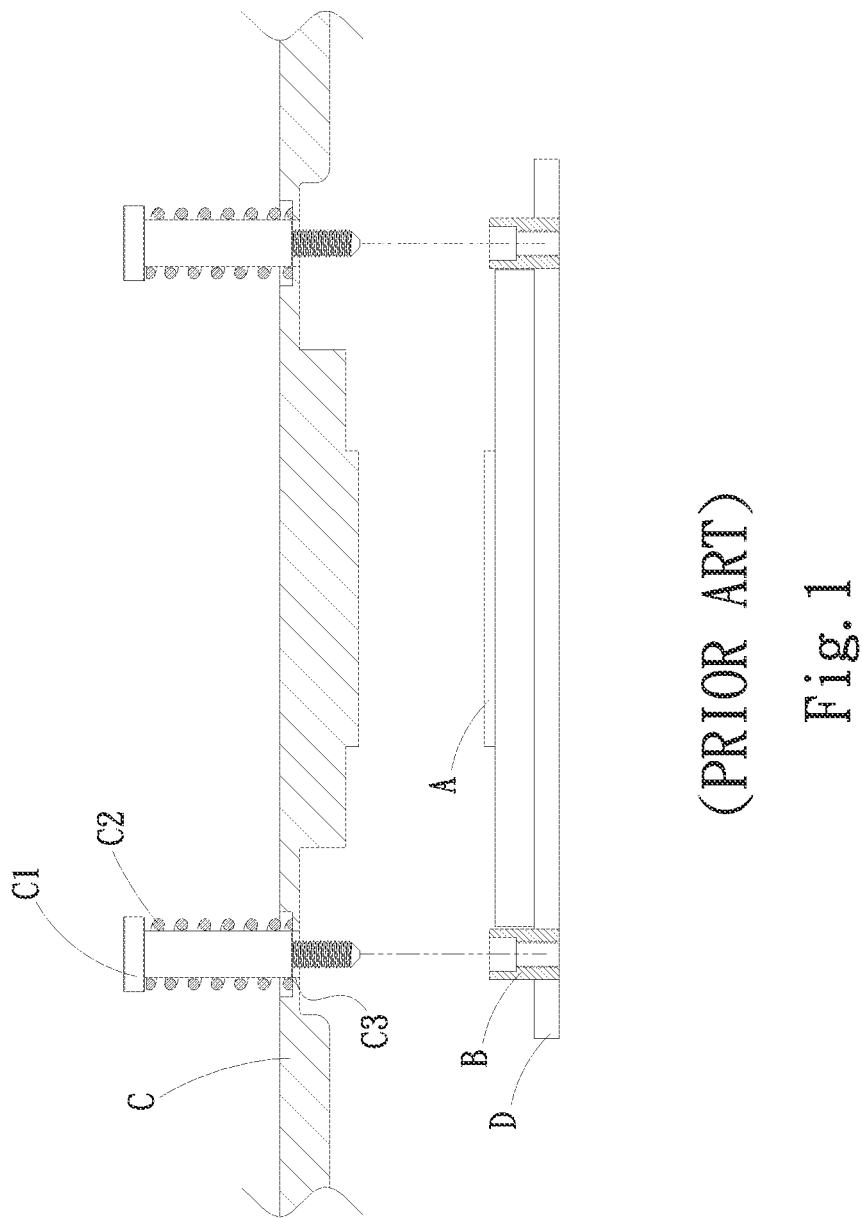
FIG. 1 shows how a heat dissipation device is connected to a bare die in the prior art.
Figure 2:
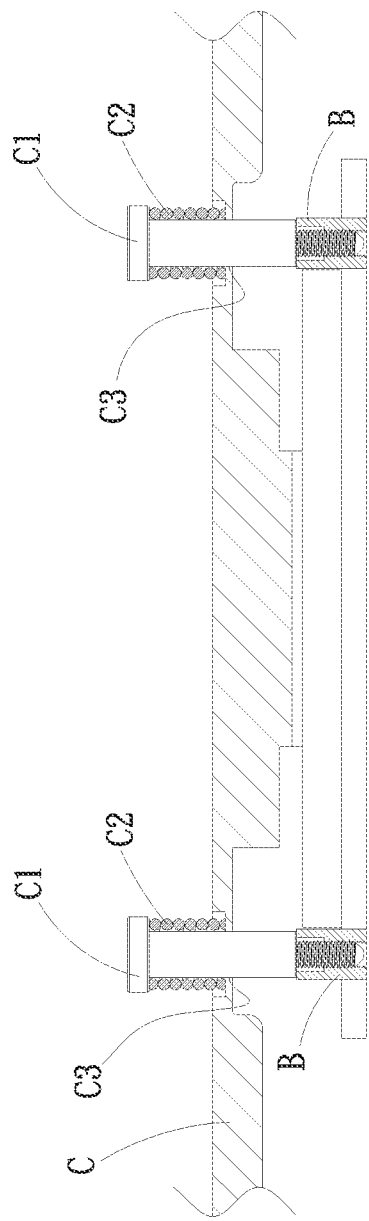
FIG. 2 shows the heat dissipation device and the bare die of FIG. 1 after being connected to each other.
Figure 3:
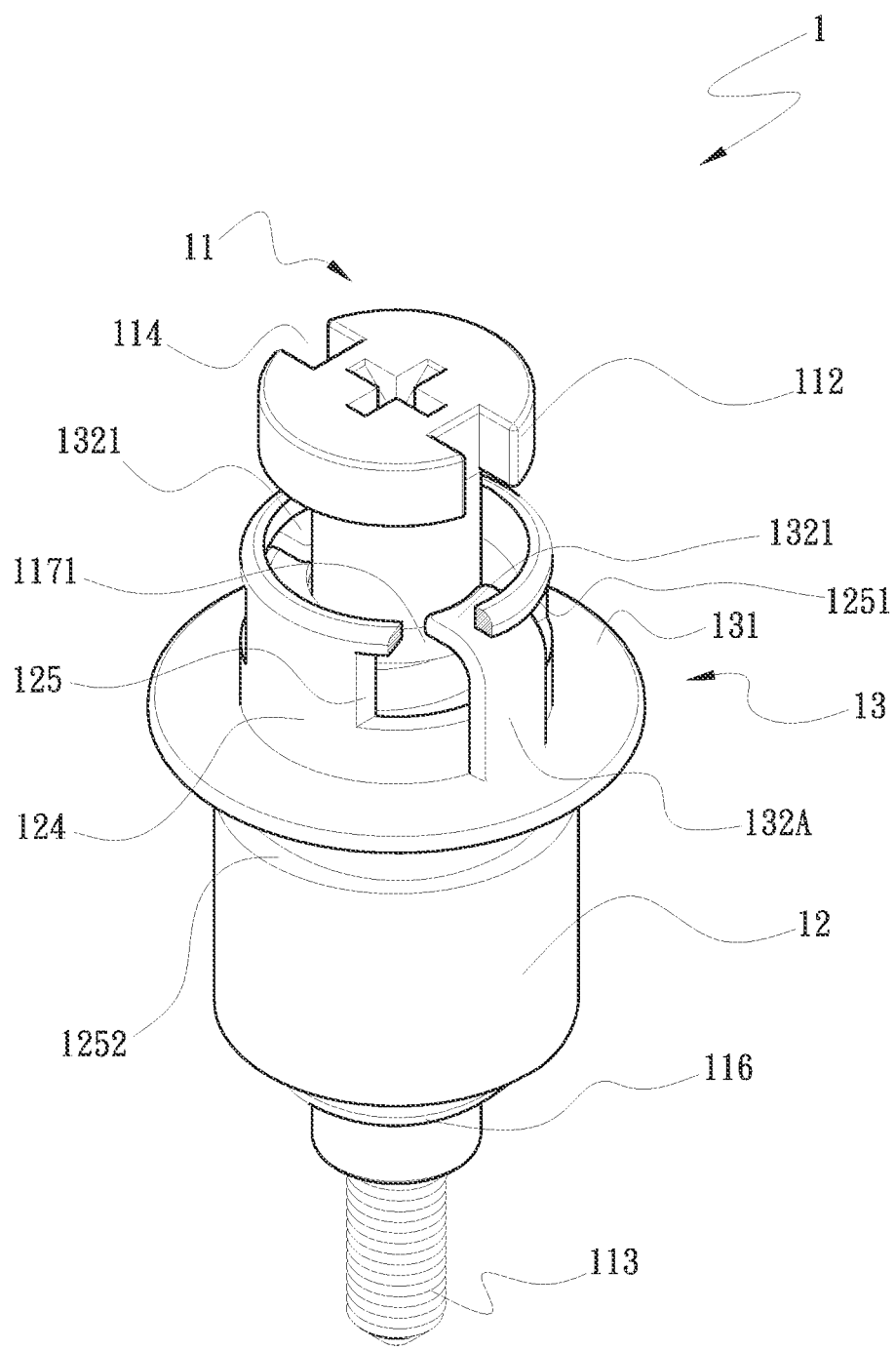
FIG. 3 is an assembled perspective view of a reworkable fixing element according to a preferred embodiment of the present invention.
Figure 4:
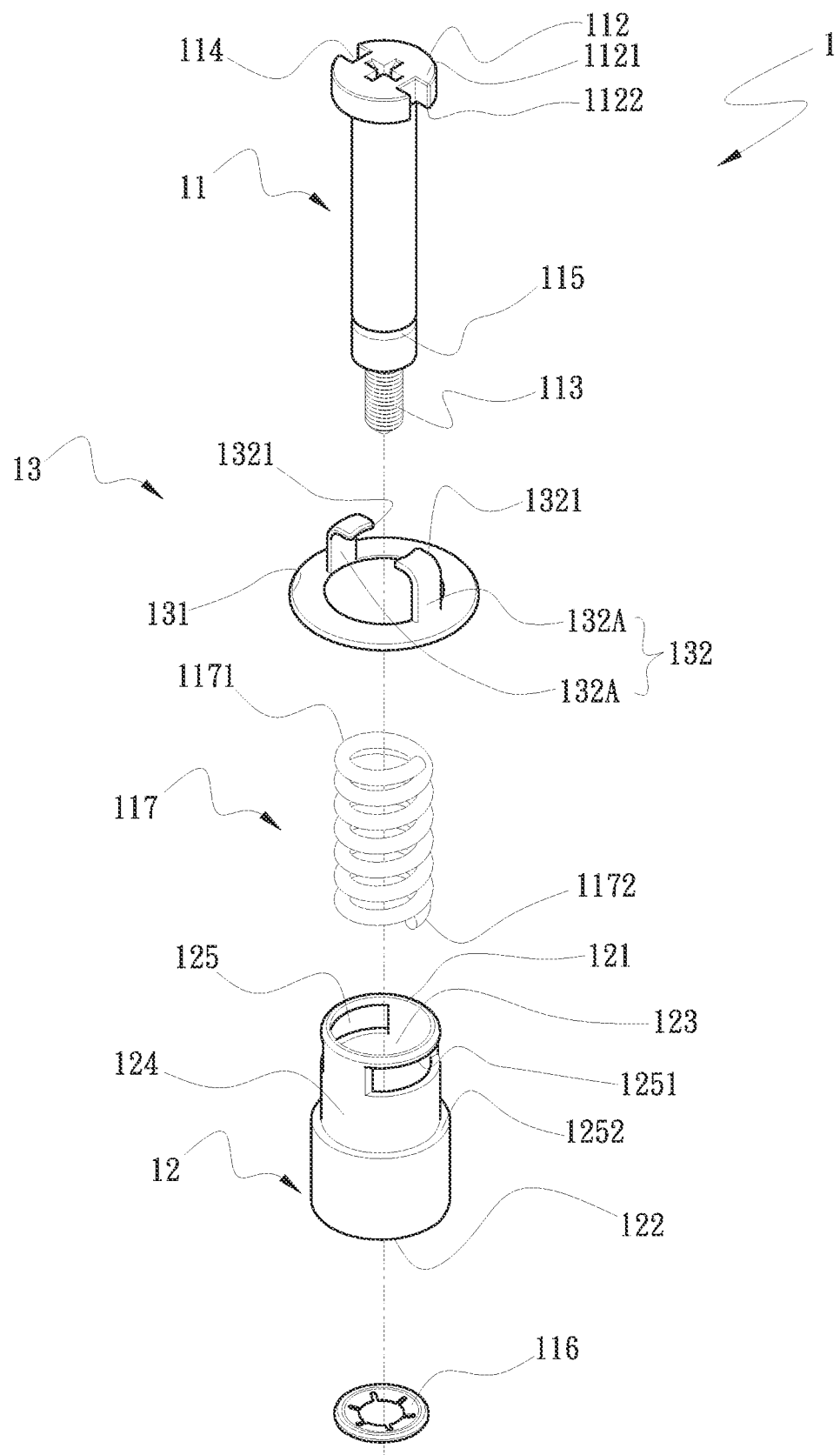
FIG. 4 is an exploded view of FIG. 3.
Figure 5:
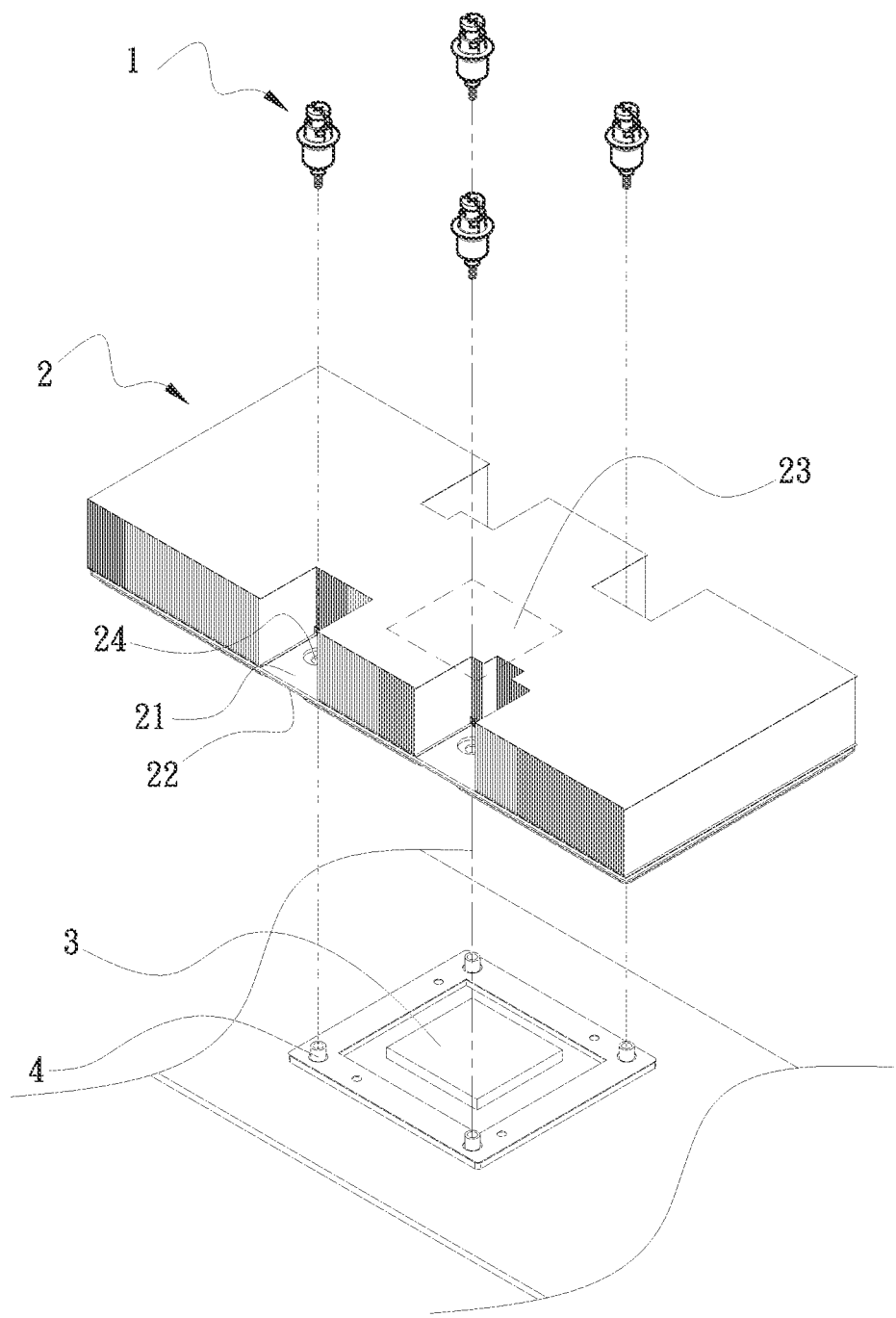
FIG. 5 is a perspective view showing a plurality of the reworkable fixing elements of the present invention is used to connect a heat dissipation device to a heat source.
Figure 7:
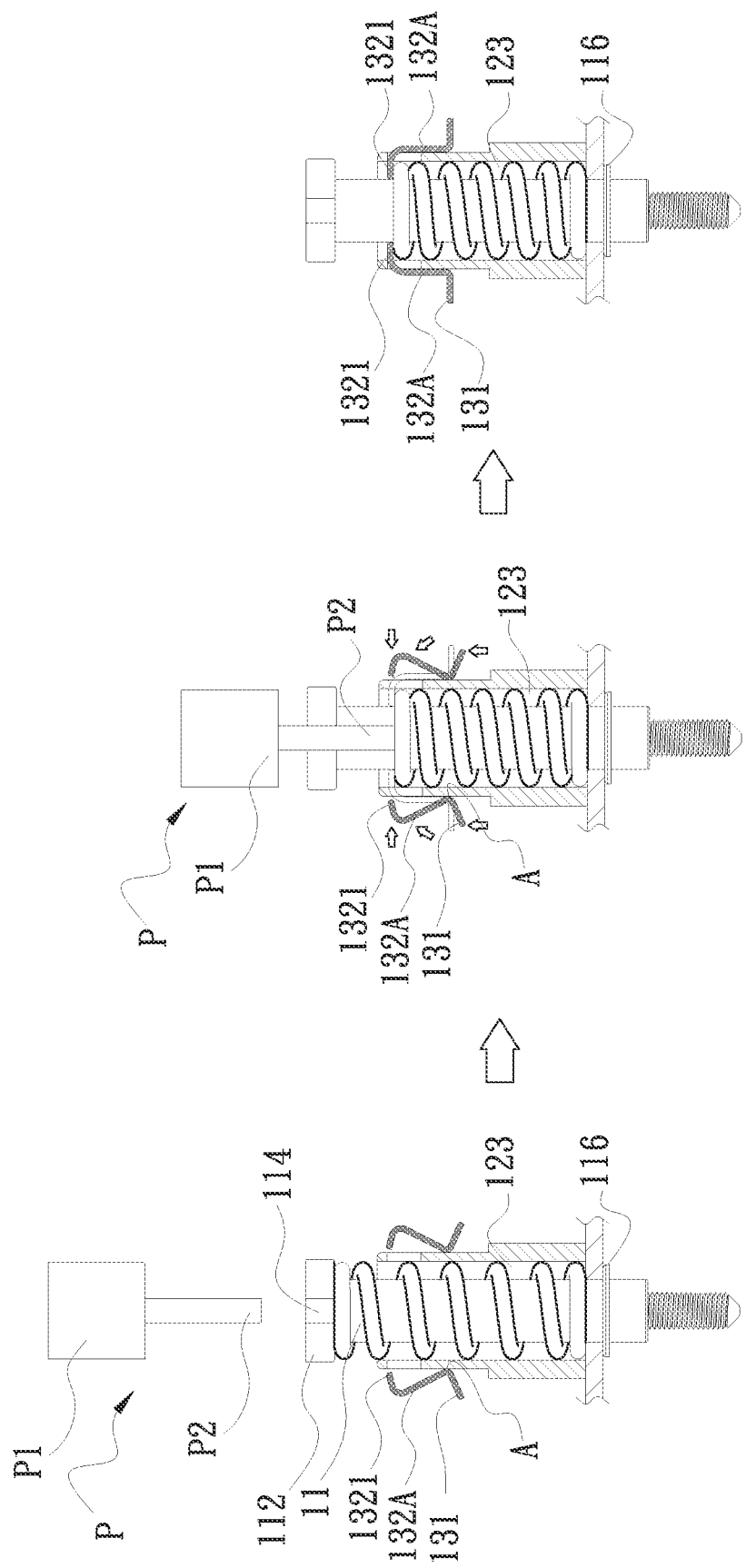
FIG. 7 includes sectional side views showing a reworking tool is used to push a released spring in the reworkable fixing element of the present invention to a compressed state again.

Please refer to FIGS. 3 and 4, which are assembled and exploded perspective views, respectively, of a fixing element 1 according to a preferred embodiment of the present invention. As shown in FIG. 7, a reworking tool P can be used with the fixing element 1 to restore an elastically released spring on the fixing element 1 to a compressed spring again, so that the fixing element 1 is reworked and can be used again for mounting to a heat dissipation device 2, as shown in FIG. 5. The reworkable fixing element 1 of the present invention includes a screw 11, a sleeve 12, and a spring retaining ring 13.

The screw 11 includes a screw head 112 and a plurality of male threads 113 located at an upper and a lower end thereof, respectively. The screw head 112 has two cuts 114, which are located at two diametrically opposite positions of the screw head 112 to axially cut through the screw head 112. More specifically, the screw head 112 has an upper end surface 1121 and a lower end surface 1122, and the two cuts 114 are extended from the upper to the lower end surface 1121, 1122. The screw 11 includes a retaining groove 115 formed axially above the male threads 113 for receiving a retaining ring 116 therein. A spring 117 is fitted on around the screw 11 between the screw head 112 and the retaining ring 116 and has a top end 1171 and a bottom end 1172. The bottom end 1172 of the spring 117 is pressed against the retaining ring 116, so that the retaining ring 116 provides an axially lower limit to the bottom end 1172 of the spring 117, preventing the spring 117 from moving down out of the screw 11.

The sleeve 12 has an open upper end 121, an open lower end 122, and a receiving space 123 defined in the sleeve 12 between the upper and the lower end 121, 122. The sleeve 12 is provided near the upper end 121 with a pair of radially retreated windows 125, which are located at two diametrically opposite positions to space from each other by 180 degrees and are radially communicable with the receiving space 123. The sleeve 12 is externally disposed around a length of the screw 11 having the spring 117 fitted thereon.

The windows 125 respectively include an upper edge 1251. A coupling zone 124 is formed on the sleeve 12 between a lower edge of the windows 125 and the lower end 122 of the sleeve 12. The coupling zone 124 may have an outer diameter the same as or smaller than that of the sleeve 12. In the latter case, the sleeve 12 has a stepped profile showing two axially different outer diameters, and a stepped section 1252 is formed around a joint between a lower end of the coupling zone 124 and the sleeve 12. The stepped section 1252 provides an axially lower limit for the spring retaining ring 13, lest the spring retaining ring 13 should excessively move downward to separate from the coupling zone 124.

The spring retaining ring 13 is fitted on around the coupling zone 124 of the sleeve 12. The spring retaining ring 13 includes an annular abutting section 131 formed on an upper side surface of the spring retaining ring 13 and a hooked arm set 132 extended upward from the upper side surface of the spring retaining ring 13. The hooked arm set 132 includes a pair of hooked arms 132A, each of which has a free end bent radially inward to form a hooked end 1321 having a horizontal top surface. The hooked ends 1321 are extended into the receiving space 123 of the sleeve 12 via the windows 125. The top end 1171 of the spring 117 is elastically upward pushed against the hooked ends 1321 to move them upward until the horizontal top surfaces of the hooked ends 1321 are abutted against the upper edges 1251 of the windows 125. At this point, the top end 1171 of the spring 117 is also limited by the upper edges 1251 of the windows 125, stopping the spring 117 from elastically upward expanding any further to stay in a compressed state in the sleeve 12. In the present invention, the spring retaining ring 13 can be loosely or tightly fitted around the coupling zone 124 on the sleeve 12.

To assemble the fixing element 1 of the present invention, first put the screw 11 and the spring 117 fitted thereon into the receiving space 123 of the sleeve 12. Since the hooked ends 1321 of the hooked arms 132A of the spring retaining ring 13 are pressed against the top end 1171 of the spring 117, the spring 117 is stopped from elastically expanding upward and therefore stays in a compressed state.

Figure 6:
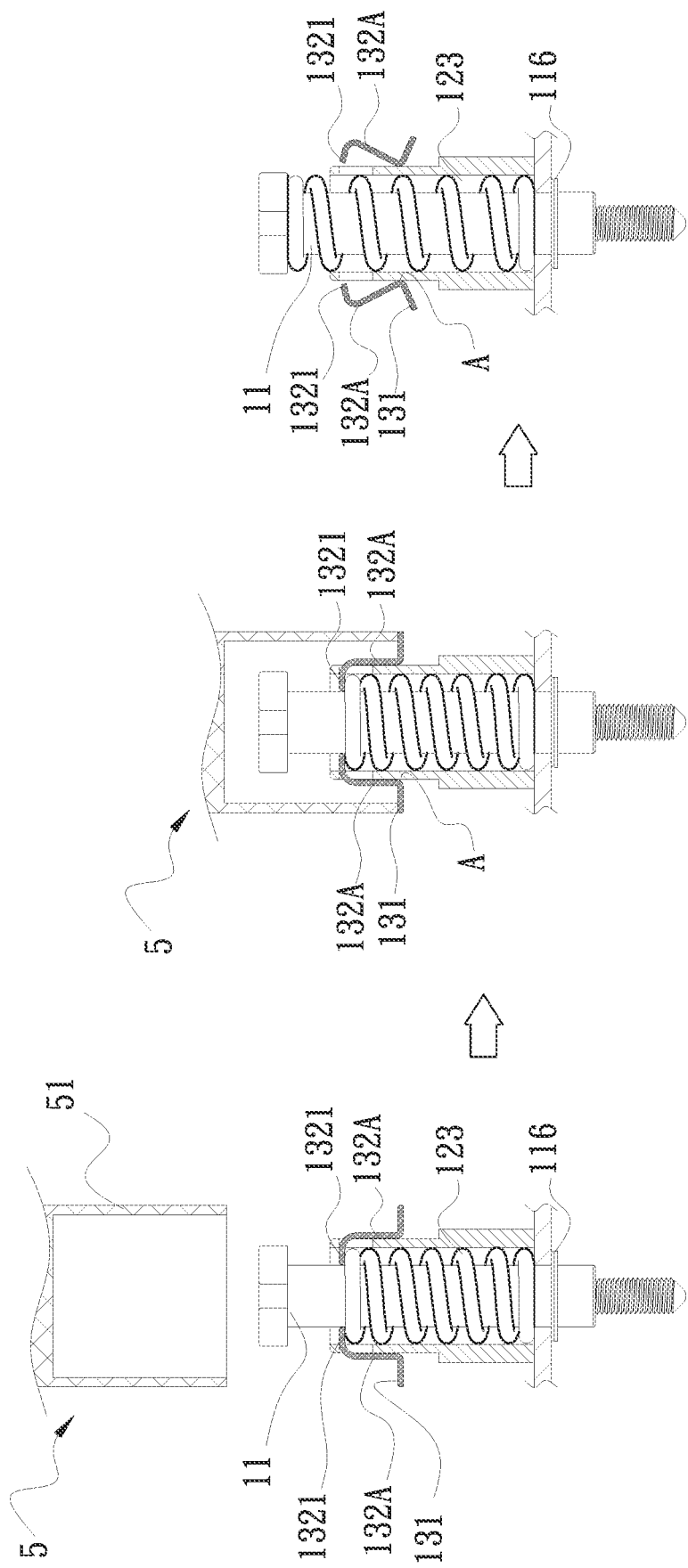
FIG. 6 includes sectional side views showing a pressing tool is used to release a compressed spring in the reworkable fixing element of the present invention.

Please refer to FIGS. 5, 6 and 7, which show how the fixing element 1 of the present invention is used to connect a heat dissipation device 2 to a bare die heat source 3 and how the fixing element 1 is reworked for use a second time. As shown, the heat dissipation device 2 has a first side 12, an opposite second side 22, and a heat receiving zone 23. The heat receiving zone 23 is located on the second side 22 of the heat dissipation device 2 near a central area of the second side 22.

A plurality of the fixing elements 1 is pre-mounted to through holes 24 formed at four corners outside the heat receiving zone 23 of the heat dissipation device 2. To connect the heat dissipation device 2 to the bare die heat source 3 for the purpose of heat exchange or heat transfer, first align and preliminarily screw the male threads 113 of the screws 11 of the fixing elements 1 into holding structures 4, such as internally threaded sleeve rods, that are correspondingly provided at four corners outside the heat source 3. At this point, the springs 117 fitted around the screws 11 have not yet released their elastic forces. That is, the heat dissipation device 2 is only located above the heat source 3 without applying pressure to the heat source 3, and a surface of the heat receiving zone 23, i.e. the second side 22 of the heat dissipation device 2, is only in a light contact with a surface of the heat source 3. For the heat dissipation device 2 to apply even downward forces to the heat source 3, the springs 117 of the fixing elements 1 on the four corners outside the heat receiving zone 23 must release their elastic forces synchronously.

For the springs 117 on the fixing elements 1 to be triggered to release their elastic force synchronously, a pressing tool 5 connected to an apparatus (not shown) is used for all the fixing elements 1 to move down synchronously and accordingly, to provide a downward force each. The apparatus can be a punch or other mechanical equipment or machinery capable of providing downward pressure. The pressing tool 5 connected to the apparatus includes at least one extended pressing section 51, which is located corresponding to the fixing elements 1 mounted to the four corners outside the heat receiving zone 23 on a main body of the heat dissipation device 2 and is abutted on the annular abutting section 131 near an outer periphery of the upper surface of the spring retaining ring 13. When the pressing tool 5 is driven by the apparatus (not shown) to move downward, the extended pressing section 51 of the pressing tool 5 applies downward pressure to all the abutting sections 131 of the spring retaining rings 13 synchronously. A contact location between each spring retaining ring 13 and each sleeve 12 forms a rotational fulcrum A. When the pressing tool 5 applies the downward pressure to the abutting section 131 of the spring retaining ring 13, the spring retaining ring 13 is supported at the rotational fulcrum A while the abutting section 131 is turned outward and downward, such that the hooked arms 132A are brought to move radially outward relative to the sleeve 12 to move out of the windows 125 and stay in a radially outward expanded state. At this point, the hooked ends 1321 of the hooked arms 132A are no longer pressed against the spring 117, and the spring 117 is allowed to fully release its elastic restoring force, such that the top end 1171 of the spring 117 is elastically pressed against the lower end surface 1122 of the screw head 112. Meanwhile, the bottom ends 1172 of all the springs 117 fitted on the fixing elements 1 mounted to four corners outside the heat receiving zone 23 synchronously apply even downward forces to the four corners outside the heat receiving zone 23 on the heat dissipation device 2, enabling the heat dissipation device 2 to move down and contact with the heat source 3 evenly.

In the present invention, the screws 11 are used only to preliminarily mount and support the heat dissipation device 2 above the heat source 3. It is the springs 117, which are fitted on the screws 11 fixed to four corners outside the heat receiving zone 23, that actually provide the downward pressure to the heat dissipation device 2 for the latter to contact with the heat source 3 evenly. That is, when the springs 117 are no longer held down by the spring retaining rings 13, they would synchronously release evenly distributed downward forces to the main body of the heat dissipation device 2. With the present invention, it is able to solve the problems in the prior art that the screw units C1 are individually screwed one by one to result in uneven force application; or that the screw units C1 are fully tightened in one single movement or excessive pressure is exerted by the springs C2 to result in warped or broken and damaged bare die that is subjected to unevenly applied forces thereto.

In addition to provide even downward forces to the heat dissipation device 2 and the heat source 3, the fixing elements 1 of the present invention are reworkable when the heat dissipation device 2 having been mounted needs to be re-mounted or adjusted. When the fixing elements 1 are to be reworked, i.e. to be used for fixing again, a reworking tool P is used. With the reworking tool P, the previously elastically released springs 117 could be set in the sleeves 12 again and be held in the compressed state for use a second time.

The reworking tool P includes a head portion P1 and at least two independently arranged pressing columns P2 downward extended from the head portion P1. The pressing columns P2 can be correspondingly extended into the two cuts 114 on the screw head 112. When the reworking tool P is driven by a downward force, the pressing columns P2 are simultaneously driven downward to press against the top end 1171 of the spring 117, so that the spring 117 previously pushed against the lower end surface 1122 of the screw head 112 is now pushed downward into the receiving space 123 of the sleeve 12 and be compressed. When the top end 1171 of the spring 117 is pressed into the receiving space 123 of the sleeve 12 again, forces can be applied to the lower side of the abutting section 131 of the spring retaining ring 13 to push the abutting section 131 upward with hands or using a tool in cooperation with an apparatus. With the spring retaining ring 13 being supported at the rotational fulcrum A, the hooked ends 1321 of the two hooked arms 132A of the spring retaining ring 13 can be moved into the receiving space 123 via the windows 125 to press against the top end 1171 of the spring 117 again. At this point, the hooked ends 1321 of the hooked arms 132A have their upper side surface pressed against the upper edges 1251 of the two windows 125 and are limited by the windows 125 from moving axially. Therefore, the spring 117 returned back into the sleeve 12 is held by the spring retaining ring 13 to the compressed state again and can be advantageously used a second time when the heat dissipation device 2 is reworked.

In brief, in addition to be used for connecting the heat dissipation device 2 to the heat source 3 in the form of a bare die, the used fixing element of the present invention can also be reworked for use a second time when the previously mounted heat dissipation device 2 needs to be reworked or replaced.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A reworkable fixing element being repeatedly usable for connecting a heat dissipation device to a bare die heat source, comprising:

a screw having a spring externally fitted therearound, a screw head and a plurality of male threads formed at an upper and a lower end thereof, respectively, two cuts located at two diametrically opposite positions on the screw head to axially cut through the screw head, and a retaining groove formed closely above the male threads for receiving a retaining ring therein; and the spring having a top end and a bottom end with the bottom end pressed against the retaining ring such that the spring is held between the retaining ring and the screw head before connecting the heat dissipation device;

a sleeve having an open upper end, an open lower end, and a receiving space defined in the sleeve between and communicable with the upper and the lower end; the sleeve including a pair of windows correspondingly formed near the upper end at two diametrically opposite positions and being communicable with the receiving space, and an outer surface of the sleeve located between a lower edge of the windows and the lower end of the sleeve being defined as a coupling zone; the sleeve being configured to be mounted on the heat dissipation device; and the sleeve being externally disposed around a length of the screw having the spring fitted thereon; and a spring retaining ring being fitted on around the coupling zone of the sleeve and including an upward extended hooked arm set, which includes a pair of hooked arms for extending into the windows of the sleeve to abut on the top end of the spring and hold the spring in an elastically compressed state; and the hooked arms of the spring retaining rings on a plurality of fixing elements being operable to move out of the windows for the springs to release from the compressed state synchronously when the fixing elements are used to connect the heat dissipation device to the heat source, so that the released springs can apply synchronous and even downward forces to the heat dissipation device; and wherein, when the screw is used to connect the heat dissipation device, the retaining ring is first detached from the retaining groove, allowing the bottom end of the spring to contact and apply force to the heat dissipation device, and after the screw and the spring are installed on the heat dissipation device, the retaining ring is then reinstalled in the retaining groove to secure the spring; and wherein, when the fixing element having been tightened to connect the heat dissipation device to the heat source is to be reworked, a reworking tool is used to axially extend through the two cuts on the screw head to apply axially downward pressure to the top end of the spring and compress the spring into the sleeve, and the hooked arms are allowed to extend through the windows and press on the top end of the spring again to hold the spring in the compressed state.

2. The reworkable fixing element as claimed in claim 1, wherein the screw head has an upper end surface and a lower end surface, and the cuts are extended from the upper to the lower end surface of the screw head.

3. The reworkable fixing element as claimed in claim 1, wherein the windows respectively have an upper edge, and the hooked ends of the hooked arm set respectively having an upper side surface pressed against the upper edges of the windows, so that the upper edges of the windows respectively limit the hooked ends from moving upward axially.

4. The reworkable fixing element as claimed in claim 1, wherein the coupling zone has an outer diameter smaller than that of portions of the sleeve other than the coupling zone, such that a stepped section is formed around a lowermost end of the coupling zone; and the stepped section providing an axially lower limit for the spring retaining ring, preventing the latter from excessively move downward to separate from the coupling zone.

5. The reworkable fixing element as claimed in claim 1, wherein the spring retaining ring includes an annular abutting section, which is located on an upper side surface of the spring retaining ring near an outer peripheral edge thereof.

6. The reworkable fixing element as claimed in claim 1, wherein the reworking tool includes a head portion and at least two independently arranged pressing columns downward extended from the head portion for correspondingly extended into the two cuts on the screw head.

7. The reworkable fixing element as claimed in claim 6, wherein when the reworking tool is driven by a downward force, the pressing columns are simultaneously driven downward to press against the top end of the spring, such that the top end of the spring that is released from the compressed state and pressed against the lower end surface of the screw head is now pushed down into the receiving space of the sleeve and held to the compressed state again.

* * * * *